United States Patent
Goshima et al.

[15] 3,703,129
[45] Nov. 21, 1972

[54] CAMERA PROVIDED WITH A RECORDING DEVICE FOR A PHOTOGRAPHED DATE

[72] Inventors: Takeshi Goshima, Tokyo; Tooru Miyasaka, Yokohama, both of Japan

[73] Assignee: Canon Kabushiki Kaisha, Tokyo, Japan

[22] Filed: April 10, 1970

[21] Appl. No.: 27,285

[52] U.S. Cl. ............................................. 95/1.1
[51] Int. Cl. ............................................ G03b 17/24
[58] Field of Search ................................. 95/1.1

[56] References Cited

UNITED STATES PATENTS 2,226,364   12/1940   Anthony ..................... 95/1.1
1,926,879   9/1933   Miller ....................... 95/1.1 X
3,111,886   11/1963   Berning ..................... 95/1.1

*Primary Examiner*—John M. Horan
*Attorney*—McGlew and Toren

[57] ABSTRACT

A camera provided with a recording device for a photographed date, comprising an auxiliary optical lens system common to day, month and year for making an image of a date onto film overlapping on a part of a picture from an outer object, three rings for date preselection, a middle one of said rings being supported coaxially and slidably arround an inner one of said rings and supporting a remaining outer one of said rings coaxially and slidably around said middle one of said rings, each of said rings having a recording part for date and an inspection part and a member for manipulation from an outer face of a camera.

4 Claims, 5 Drawing Figures

CAMERA PROVIDED WITH A RECORDING DEVICE FOR A PHOTOGRAPHED DATE

This invention relates to a camera, particularly to a camera provided with a recording device for a photographed date onto a film together with a picture taken thereon. Such a kind of camera having a recording device for data has already been proposed in great numbers, however, most of them are very complicated in their structures, requiring much space and inevitably becoming larger in their sizes. Further, signals such as letters and/or numerals recorded on the film are respectively manipulated from outside of the camera, so that numerals for year, month and day are held on separate holders and said numerals are got separated from each other, so that s separate optical system for recording onto the film must be provided in one set for each of signals.

In this invention, the space between a magazine wall and a frame for passing photographing light from an outer object, which has been a dead space in the past, is made use of to receive a date preselecting cylinder, for an object of providing a recording device for photographed date within a camera, without remodelling largely of usual camera.

Another object of this invention is to obtain a recording device, wherein date numerals may be clearly recorded concisely at a corner of a picture of film by means of a set of optical system.

Further object of this invention is to provide a shielding member for prohibiting a stray light and for permitting transmission of signal lights on the midway of an optical system of a recording device for a photographed date, interlocking said shielding member with a release member for shutter, and when the recording of the date is not necessary, said shielding member is held at its closed position selectively.

The present invention will be described referring to the attached drawings in which.

Figure 1:
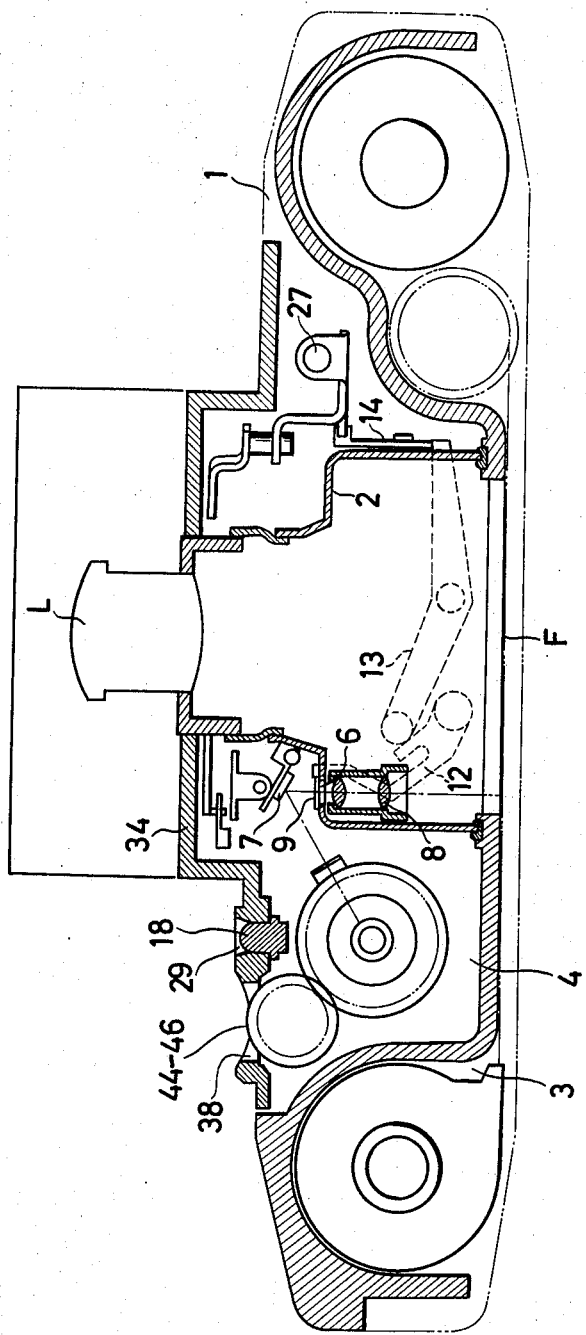
FIG. 1 is a central section of a camera provided with a recording device according to the present invention.
Figure 2:
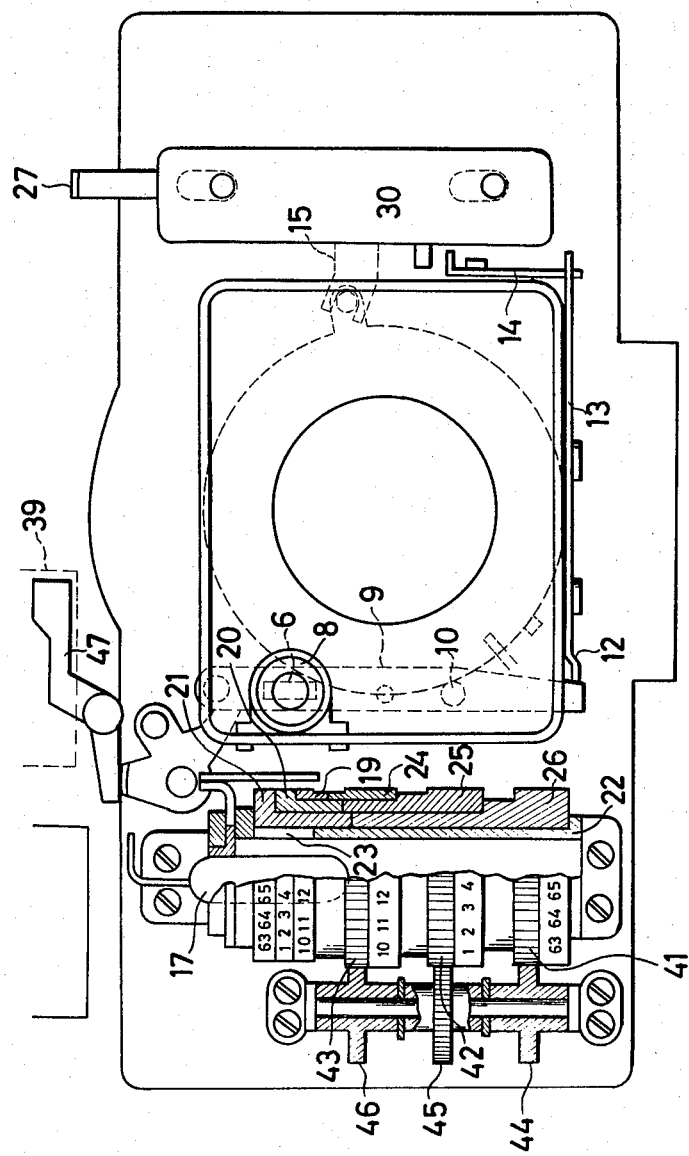
FIG. 2 is a general arrangement plan of the recording device according to the present invention, wherein a front plate of the camera is seen from the reverse side.
Figure 3:
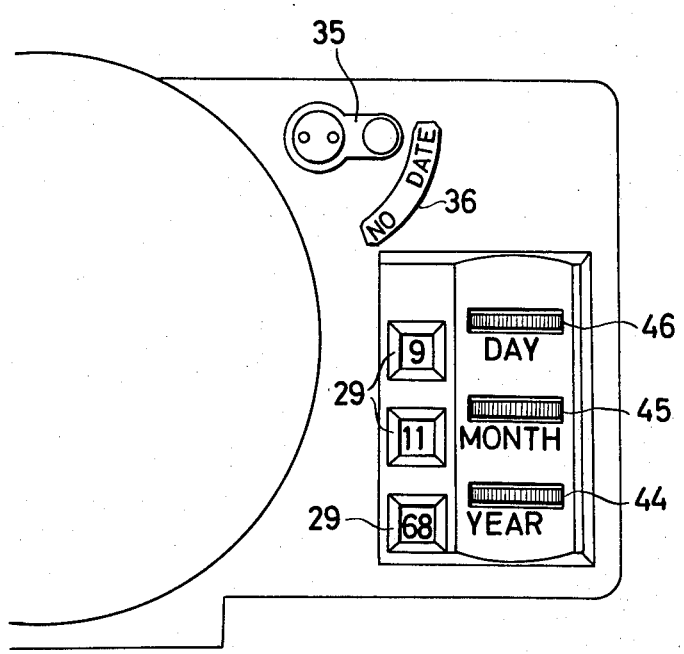
FIG. 3 is a front view of a portion of the front plate.

In the accompanying drawings, a cylindrical shaft 22 having a slit 23 is provided parallel to the direction of axis of a magazine, in a space 4 between a magazine, chamber 3 and an obscurer light shield 2 for photographic light passage, and a ring for year numerals 21, a ring for month numerals 20 and a ring for day numerals 19, which rings are respectively made of transparent material, are arranged with their surfaces having respective numerals on a surface parallel to the axis of a shaft 22 in a form of three-ply, being loosely put on the shaft 22. A lamp 17 is housed in an inside space of the shaft 22 to light up each one numeral facing to a slit 23 among a plurality of numerals on the periphery of said ring 21, 20 and 19, thus said numerals is introduced into the photographic light passage of a photographic lens L through a mirror 7 and a lens 8 to be focused into image on an edge of picture taken on a film. Rings 26, 25 and 24 having indicating numerals for observation are respectively fixedly provided onto the extension of each of said rings 21, 20 and 19 having numerals, so that the numerals on the rings 26, 25 and 24 corresponding to the numerals facing to the slit 23 of the supporting shaft 22 may be looked in at a front window 29 of the camera body 1 and each of the combined rings 21, 26; 20, 25; and 19, 24 is so constructed as to be turned from outside of the camera body.

In the embodiment shown in the drawings, rings having numerals 21, 26; 20, 25; and 19, 24 are made as separate bodies and are assembled in a body, however, they may be made of transparent material integrally. For rotating the rings having numeral from outside of the camera body, gears 41 to 43 are fixedly provided with each rings 26, 25 and 24 having numerals, a part of said gears is turned by gears 44 to 46. The gear 44 to 46 are provided partially exposedly on the front side of the camera body and thus can be easily manipulated from outside.

6 denotes an aperture provided on the obscura 2 and 18 denotes a magnifier provided on a window 29.

In such a construction, the space 4 can be hardly made light-tight, and if the aperture 6 is always opened, it is feared that the light would come through, so that said aperture 6 is provided with a shielding member 9 provided in the obscure 2 and urged by a spring 11 always in the direction of opening the aperture.

A lower end 9-1 of the shielding member 9 is connected to a release lever 15 through connection levers 12 to 14, and a spring 16 provided on the lever 13 to prevent the spring 11 from opening the aperture.

Figure 5:
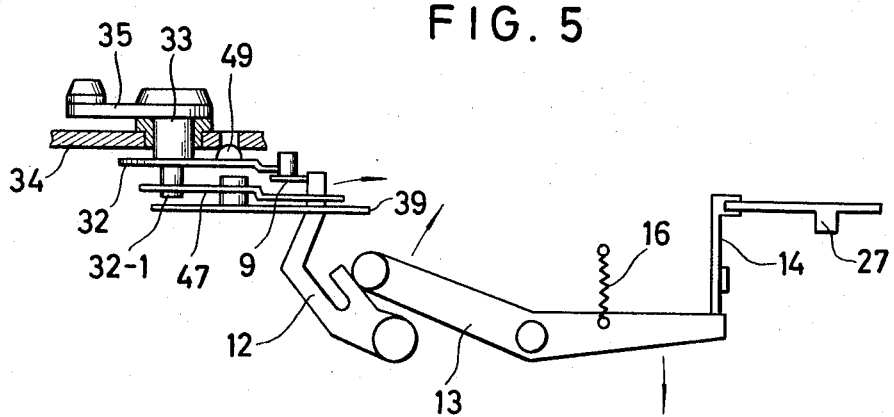
FIG. 5 is a plan of said change-over mechanism.

When a release button 27 is pushed, a release transmitting member 30 pushes a release connection lever 14 and its lower face rotates a lever 13 in a clockwise direction against the force of the spring 16 to release the lever 12, as shown in FIG. 5. So that, the shielding member 9 is rotated by the spring 11 in a counter-clockwise direction to open the aperture 6 and to pass the signal light, when the shutter button is released from being pushed, the shielding member 9 will return to its original position, so that the aperture is opened during the time only when the shutter button is pushed.

Any of moving elements may be interlocked so as to close a switch (not shown) of a lamp 17 at the same time with the opening motion of said shielding member 9. On and off action of the lamp 17 may be synchronized with the release action of the shutter. In this case synchronous contacts for flash photograpy in the camera are conveniently used and the lamp 17 is illuminated only when the contacts are shorted.

A pin 31 provided on the upper end of the shielding member 9 is held down by an end 32-1 of a change-over plate 32 so that the shielding member 9 keeps an original state in spite of shutter releasing. For this purpose the levers 13 and 12 are urging in a relief direction, and the aperture 6 remains closed, so that the light may not pass and no date is recorded.

For effecting the change-over to "need" or "no need" of recording the date, a shaft 33 of said change-over plate 32 is fixed to a front plate 34 of the camera, and on the change-over plate 32 a change-over lever 35 is provided for selection and indication of recording state.

An indication mark 36 for instance "DATE" or "-NO" is provided on the front plate 34.

According to the present invention, the aperture 6 date recording is normally closed by the shielding member 9, so that the light coming through, for instance, an inspection window 29 for observing date or a hole 38 for a manipulating member for changing data may be thoroughly prevented.

And since the shielding member in engagement with the release motion of the release button 27 retreats from the aperture 6 at the time of shutter releasing, the date recording is performed automatically.

At this time, the additional load on to the release motion for opening the shielding member 9 is so small and serves only to relieve the levers 13 and 12 and the shielding member 9 is so formed as to follow the levers 12 and 13 with aid of the spring 11, so that the additional load may be neglected. Further, it is possible to prevent or permit the movement of the shielding member 9 with the change-over lever 32. In this case, there is an advantage that said change-over may be effected independently of the release mechanism, so that it is useful as a device for recording of photographed date as well as for automatic change-over.

Further, when the recording of photographed date is effected in the picture of film in an overlapping manner, letters will hardly appear in a white ground. Therefore, if the indication mark for date position is shown in a finder, the position of a photographed date may be selected when a picture is composed.

Figure 4:
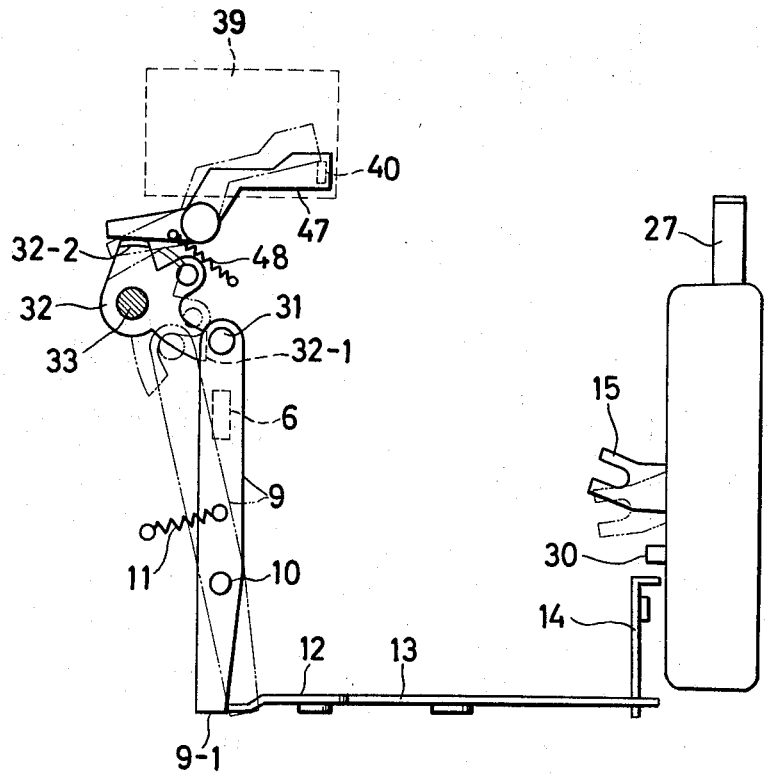
FIG. 4 is a front view of a change-over mechanism according to the present invention.

To attain the above purpose, an indication mark 40 for recording of date is provided in the field of a mark finder 39, as shown in FIG. 4. It becomes more convenient to display the indication mark 40 when the date is recorded and to cover the mark when the date is not recorded. Then, a lever 47 is provided to face with a projection 32–2 provided on a change-over plate 32, which plate 32 presses down the shielding member 9, and when the photographed date is not recorded, the projection 32–2 pushes a covering lever 47 against a spring 48 to cover the indication mark 40. In FIG. 5, 49 denotes a click stop of the change-over lever 32.

In the present invention, the date preselecting cylinder formed as above is so arranged in a space between the frame of passage for photographing light and the magazine wall on outlet side that the axis of the date preselecting cylinder lies parallel to the axis of the magazine, so that the recording device for date may be housed with a simple construction, without remodelling largely. And, parts of gears 41 to 43 are partially exposed from the front wall of a camera just in front of the recording device and they may be operated by hand directly and signals for inspection may be observed through the window provided on the front face of a camera, so that the operation is achieved without errors.

Further, the signals for date to be recorded on the film are arranged close to one another within a camera, so that by means of a common optical system, a date recording are may be disposed concisely in verticalwise or horizontalwise within a picture.

What is claimed is:

1. A camera, comprising a date preselecting cylinder, date manipulating means composed of gear wheels rotatably supported in a fixed position in said camera and coupled to said preselecting cylinder, cylindrical supporting means for said date preselecting cylinder, said supporting means having an interior cavity and a slit in the periphery thereof, a light source arranged in the cavity of said cylindrical supporting means, said data preselecting cylinder being arranged coaxially and rotatably on said cylindrical supporting means and composed of light transmitting rings, each of said light transmitting rings having dates recorded thereon, said rings being slidably supported coaxially around each other and around said supporting means, each of said rings having a recording portion for dates and inspection portions, said recording portions transmitting light emitted from the light source in said cylindrical supporting means through the slit on said cylindrical supporting means, said inspection portions each having a gearing member meshed with said manipulating means, said camera having an outer wall, a partition in said wall forming an enclosed space in the camera and a second space for passage of light from an object to be photographed, said date preselecting cylinder being located in the first space, a film magazine in said second space, the axis of said cylinder being parallel to the axis of said magazine, said manipulating gears projecting through the outer wall to be manually operable from the outside of the outer wall, a window in the outer wall for receiving the inspection portion so that the date can be adjusted on the basis of information on the inspection portion, said camera having a shutter and light source actuating mean to cause said light to illuminate the cylinder when the shutter is released, and optical means projecting through the partition into said second space for transmitting the light through said rings and said optical means into the second space so that the light travels in the same direction as the light from an object to be photographed.

2. A camera, as in claim 1, wherein said optical means includes a portion of said partition having an opening, shielding means mounted for covering said opening, a spring for urging said shielding means away from said opening, and actuating means responsive to said shutter for holding said shielding means over said opening while said shutter is not actuated and for releasing said shielding means when the shutter is actuated.

3. A camera as in claim 1, wherein said optical means includes a plurality of lenses arranged in said partition and a mirror for directing the light from said light source to said lenses, said outer wall forming a focal plane, said lenses being arranged to direct the light from said light source toward the focal plane.

4. A camera as in claim 2, said shielding mean having a changeover member shiftable to a release-permitting position and a release-prohibiting position, said changeover member being coupled to said shielding means for permitting said shielding means to operate in response to said shutter when said changeover member is in the release-permitting position and for prohibiting movement of said shielding means from said opening in response to the shutter when said shielding member is in the release-prohibiting position.

* * * * *